United States Patent [19]

Rush et al.

[11] Patent Number: 4,877,151

[45] Date of Patent: Oct. 31, 1989

[54] SNAP-ON LID AND MOLD FOR MAKING THE LID

[76] Inventors: Jonathan E. Rush, 310 Prospect St., Philipsburg, N.J. 08865; Phillip D. Scalvini, 1267 Saddle Dr., Nazareth, Pa. 18064; Reinhold Gerber, 3000 Swanson St., Easton, Pa. 18042

[21] Appl. No.: 214,053

[22] Filed: Jun. 30, 1988

[51] Int. Cl.$^4$ ............................................. B65D 21/02
[52] U.S. Cl. ................................... 206/514; 206/499; 206/519; 425/388
[58] Field of Search ............... 206/499, 501, 508, 514, 206/519; 220/355; 425/388, 405.1

[56] References Cited

U.S. PATENT DOCUMENTS

| | | | |
|---|---|---|---|
| 1,786,733 | 12/1930 | Benoit | 206/519 X |
| 1,813,810 | 7/1931 | McDonald et al. | 206/519 |
| 1,931,595 | 10/1933 | Weguelin | |
| 3,379,340 | 4/1968 | Silvio | |
| 3,441,983 | 5/1969 | Cheney | 425/388 X |
| 3,498,495 | 3/1970 | Davis | |
| 3,632,016 | 1/1972 | Bozek | 220/355 X |
| 3,883,036 | 5/1975 | Mahaffy et al. | |
| 3,931,890 | 1/1976 | Davis | 206/508 |
| 4,239,727 | 12/1980 | Myers et al. | 425/388 X |
| 4,275,815 | 6/1981 | Davis | 206/508 |

FOREIGN PATENT DOCUMENTS 1299425 12/1972 United Kingdom ............... 206/508

Primary Examiner—Stephen M. Hepperle
Attorney, Agent, or Firm—Sixbey, Friedman, Leedom & Ferguson

[57] ABSTRACT

A thin walled, plastic, disposable lid is provided having a generally circular closure wall including an integral peripheral skirt depending from the rim portion thereof. The closure wall is divided into a central portion and an annular outer portion with the annular outer portion lying in a plane below that of the central portion. The two portions are connected by way of a U-shaped recess which has a bottom wall lying in a plane below that of the annular outer portion. A plurality of lug members extend downwardly from the bottom wall and are positioned at predetermined segments of the bottom wall. The lug members also extend downwardly a predesigned distance so as to position the bottom wall of the recess of a first lid in a stack coplanar with the central portion of the lid on which the first lid rests. Also, the peripheral skirt includes a plurality of inwardly directed lands with a plurality of flutes of varying circumferential lengths positioned between the lands in order to space the lands about the skirt.

37 Claims, 5 Drawing Sheets

SNAP-ON LID AND MOLD FOR MAKING THE LID

BACKGROUND OF THE INVENTION

1. Technical Field

This invention relates to disposable, thin-wall, plastic lids, and the mold for making such lids. More particularly, this invention relates to a novel lid for use in closing containers of the type having a peripheral bead about the open end thereof.

2. Background Art

Due to the rapidly growing use of disposable, thin-wall, plastic lids in fast food establishments, vending machines and automatic filling equipment, the need has arisen for a lid whose design permits a plurality of such lids to be formed into a stack having unsupported lateral stability while preventing individual lids from jamming when the stack is subjected to axially applied loads. Early attempts to solve this need include the provision of stacking facilities in the form of radial undercuts in the side wall of the lid whereby the undercuts form internal and external shoulders that cooperate with identical stacking facilities in adjacent lids so that the internal shoulder of the upper lid would rest on the external shoulder of a lower lid of the stack. U.S. Pat. No. 3,379,340 to Silvio discloses a lid of this type. This arrangement prevents lateral displacement of one lid relative to another when the lids are stacked in telescopic relationship. However, this arrangement makes separating the lids and removal of a single lid from the top of the stack difficult at times because the lids can become stuck together. Also these undercuts are generally provided in the skirt of the lid which is particularly thin, lacks rigidity and will deform under excessive loads. Consequently, these undercuts do not always perform as intended.

In solving the problems associated with the above mentioned lid stacks, U.S. Pat. No. 4,275,815 to Davis issued June 30, 1981, has provided a plurality of circumferentially spaced, downwardly extending feet, with each adjacent lid having a different number of feet to keep the lids from becoming aligned and telescoping. These feet are positioned such that the feet of one lid in a stack will rest on a depressed central portion of a lower lid. The feet provide for both resistance against jamming of the successive lids as well as resistance against lateral displacement of adjacent lids. However, due to the circumferential spacing of these feet the lids are capable of lateral movement which is greater than the designed tolerance between the feet and the recess wall. Also, lateral forces exerted on the lids are assumed directly by the feet themselves which can result in deformation of the feet and the subsequent possible unwanted telescoping and jamming of the lids within the stack. Others have suggested anti-jamming lugs for lids wherein the spacing radially or circumferentially of the lugs from one lid to the next is varied, for example U.S. Pat. Nos. 1,786,733 to Benoit; 1,931,595 to Weguelin; and 3,632,016 to Bozek.

Further problems arise when lids of the dome-type are utilized as opposed to those having a central depression as is incorporated in the lid disclosed in U.S. Pat. No. 4,275,815. As shown in U.S. Pat. No. 3,498,495, to Davis, issued Mar. 3, 1970, ribs can be provided on the external surface of a raised central portion or dome to maintain the outer surface of the dome of one lid of a stack in circumferential spaced relationship with the inner dome surface of the adjacent lid. This spacing does allow for easier separation of the lids but any axial forces generated during the maneuvering of the stack must be absorbed by the peripheral skirt and the side wall of the ribs which may deform these thin walled members, and cause excessive telescoping of the lids leading to a possible sticking problem.

Lids of the above mentioned type are often provided with a plurality of flutes and lands about their periphery. These flutes may take the shape of diamonds, as shown in U.S. Pat. No. 4,275,815 discussed above, ovals, or these flutes may be rectangular in configuration as shown in U.S. Pat. No. 3,883,036 to Mahaffy et al issued May 13, 1975. Flutes of this type are designed to provide support for the peripheral skirt against crushing in the axial direction and also to provide breaks in the waist which are formed between the lands to allow the peripheral skirt to expand outwardly over the bead of a cup to be covered and snap back below such bead. However, lids having flutes of this type often require excessive force to remove the lids from a mold during the molding process and also provide only a single circumferential zone of support which, depending upon the use of such lids, could possibly be inadequate.

SUMMARY OF THE INVENTION

It is an object of the present invention to provide disposable, thin-wall, plastic lids having improved strength against axial deformation and improved stability when stacked one atop the other.

One important object of the present invention is to provide lids having flutes in their outer peripheral skirt which form a plurality of circumferential support zones for supporting the peripheral skirt of each individual lid against axial deformation thereof, while maintaining radial flexibility in such peripheral skirt to allow the lid to be easily placed onto a container.

Another object of the present invention is to provide a lid having the improved strength against axial deformation and which may be easily removed from a mold during the molding process.

Another object of the present invention is to provide a lid having stacking facilities which support the lid in the stack and prevent each lid from telescoping relative to an adjacent lid beyond a predetermined extent to allow the lids to be readily separated during removal of a lid from the top of the stack.

Yet another object of the present invention is to provide a continuous zone of lateral contact between adjacent lids within the stack to assure reliable lateral support of the stack as a whole.

These and other objects of the present invention are accomplished by providing a thin walled, plastic lid having a generally circular closure wall having an integral peripheral skirt depending from the rim portion thereof. The closure wall is divided into a central portion and an annular outer portion with the annular outer portion lying in a plane below that of the central portion. The two portions are connected by way of a U-shaped recess which has a bottom wall lying in a plane below that of the annular outer portion. A plurality of lug members extend downwardly from the bottom wall at predetermined circumferentially spaced locations in the bottom wall. The lug members also extend downwardly a redesigned distance so as to hold the central portion of adjacent lids in axially spaced position with the bottom wall of the recess of a first lid in a stack being substantially coplanar with the outer portion of the lid on which the first lid rests. Also, the peripheral skirt includes a plurality of inwardly directed lands with a plurality of flutes of varying radial and circumferential lengths positioned between the lands in order to impart greater crush resistance while affording improved removability of the lids from its forming mold. The waist of each lid is adapted to rest upon the outer circumferential edge of the next lower lid. The axial length of the lug member is selected to cause the outer portion to be supported internally by the lug member and externally by the waist/outer ridge in a manner to maintain the outer portion such that it remains undistorted when axial loads are applied to the stack. Other and more specific objects of the invention may be appreciated from the following Description of the Drawings.

DESCRIPTION OF THE PREFERRED EMBODIMENT

Figure 1:
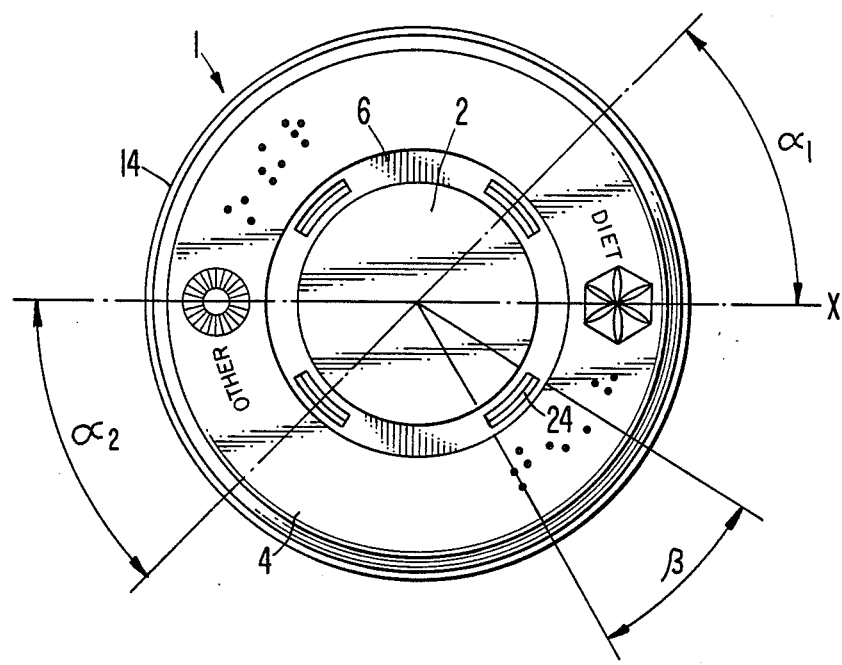
FIG. 1 A top view of the lid according to a preferred embodiment of the invention.
Figure 2:
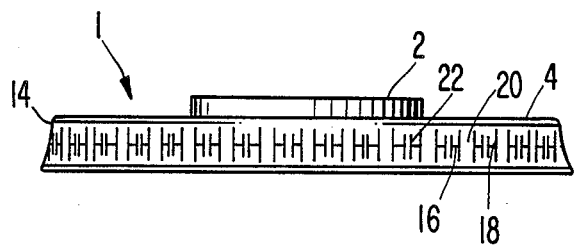
FIG. 2 An elevation view of the lid of FIG. 1.
Figure 3:
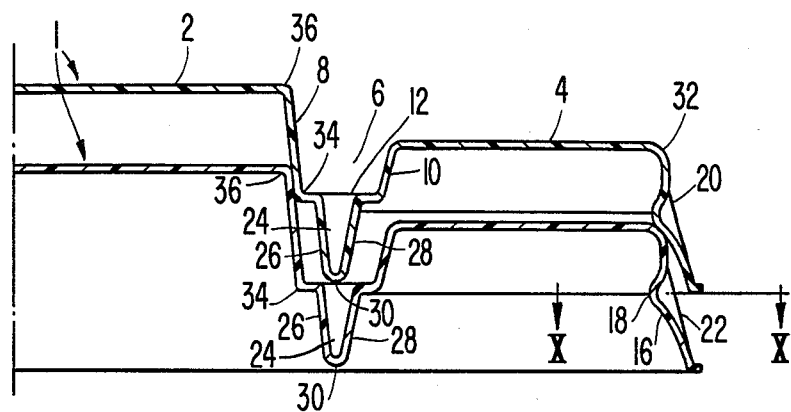
FIG. 3 A partial cross-section elevation view of two lids stacked one upon the other according to the present invention.

FIGS. 1 and 2 of the drawings show a disposable, plastic thin walled lid 1, which is designed for a one time use, and is typically used in fast food establishments as cover-all lids for cold drinks. As shown in FIG. 3, these lids are designed to be stacked with other lids of essentially identical structure and placed on the counter in the user's establishment with no special lateral support such that the top lid may be readily removed from the stack as required.

The lids of FIGS. 1-3 include a generally horizontal closure wall which is divided into two sections, a raised central top hat section 2 and an annular section 4 which is concentric with the top hat section 2 and lies in a plane lower than that formed by the top hat section 2. The top hat section 2 and the annular section 4 are connected by way of an annular recess 6. The annular recess 6 consists of an inner wall portion 8, an outer wall portion 10, and a bottom wall 12, with the bottom wall 12 lying in a plane below that plane formed by the annular section 4.

The annular section 4 is also provided with a downwardly depending peripheral skirt 14. The skirt 14 is designed to snap over a bead formed on the rim of a cup, or the like, to form a sealed container.

Figure 10:
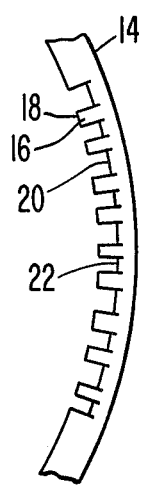
FIG. 10 A partial cross-sectional view taken along line X—X of FIG. 3.

The skirt 14, as shown in FIGS. 2 and 3 is provided with a plurality of arcuate lands 16 which extend radially inward from the peripheral skirt 14 to form a waist 18 which underlies the rim of the cup when the lid is snapped onto the cup. These lands 16 are spaced about the periphery of the skirt 14 by flutes 20 and 22. As shown in FIG. 10, the flutes 20 and 22 are of varying circumferential length, and are provided at varying radial distances from the central axis of the lid. By providing the varying radial extent of the flutes a circumferential side wall is formed having a corrugated effect which is much more resistant to forces applied to the lid 1 in both the axial direction and the lateral direction, than those lids having only a single circumferential wall. In so doing, the actual number of flutes required about the periphery of the lid 1, to provide the necessary column strength of the peripheral skirt 14, is reduced. By requiring fewer flutes, the force required to remove the lid 1 from the mold 38 during the molding process is greatly reduced.

The flutes 20, 22 add resilience to the peripheral skirt 14 in the radial direction as well. That is, the flutes 20, 22 allow the waist 18 to expand in the radial direction over the rim of a container and snap back below the rim to form a sealed container.

As is shown in FIG. 3, in order to restrain the lids 1 from telescoping relative to one another when placed in a stack, lugs 24 extending downwardly from the recess 16 are provided. These generally U-shaped lugs 24 include inner and outer side walls 26, and 28 respectively, and a rounded bottom wall 30. The rounded bottom wall 30 of a first lid of a stack extends downwardly a sufficient distance to rest on the bottom wall 12 of an adjacent lid in the stack and allow the lands 16 of the first lid to rest on an upper portion 32 of the peripheral skirt 14 of the adjacent lid. In doing so, the top hat section 2 of the adjacent lid 1 is allowed to telescope into the area formed by the top hat section 2 and the side wall 8 of the first lid. The side wall 8 of the recess 6 is of a length which essentially places a ridge 34 formed by the side wall 8 and bottom wall 12 of the first lid of the stack coplanar with a ridge 36 formed by the top hat section section 2 and the side wall 8 of the adjacent lid. Consequently, a continuous point of lateral contact is formed by the ridges 34, 36 and the portions therebetween, and it is these ridges which absorb any lateral forces which are exerted on the stack and maintain a stable stack in the absence of any special lateral supports. It should be noted that as shown in FIG. 3. the bottom wall 12 of the recess is of a greater radial extent than that of the upward opening portion of the lugs 24 and that the inner and outer walls 26, 28 of the lugs are inwardly spaced along their entire axial length from side walls 6 and 8 of the recess 6. This will provide a space between the inner wall 26 of a first lid and the inner side wall 8 of an adjacent lid, and more importantly, provide space between the outer wall 28 of a first lid and the outer side wall 10 of the adjacent lid. Therefore, the inner and outer walls 26 and 28 of the lugs cannot contact the side walls 8 and 10 of the recess and possibly cause the lugs 24 to bend or collapse. Also, by inwardly spacing the lug side walls 26 and 28, the rim 34 will be a continuous rim.

Figure 4:
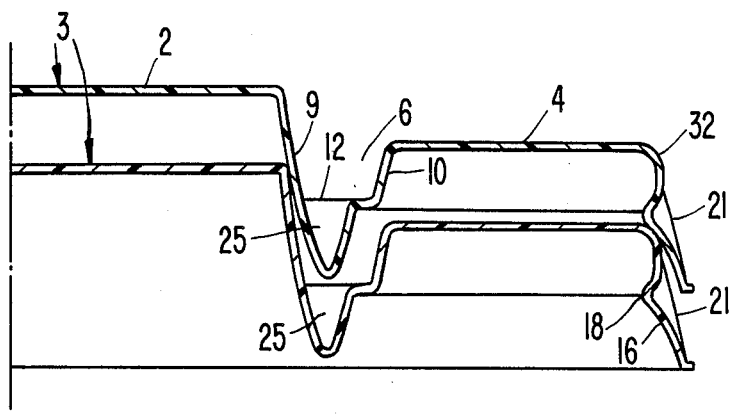
FIG. 4 A partial cross-section elevation view of two lids of the Prior Art stacked one upon the other.

FIG. 4 illustrates a known lid configuration 3. Like parts of this lid configuration are referenced by identical reference numerals as used with respect to FIG. 3. These lids include a top hat portion 2, an annular portion 4 and a recess 6. The recess is formed by side walls 9 and 10, and bottom wall 12. However, the inner side wall 9, forms not only the inner side wall of the recess, but also continues to form the inner side wall of the lug member 25, thus not providing the lug member 25 in a spaced relationship with the top hat of a lower adjacent lid. Also, uniformly shaped flutes 21 are provided about the peripheral skirt.

In order to prevent adjacent lids of a stack from telescoping into one another beyond the designed extent, the lugs 24 of adjacent lids must remain out of phase with one another, i.e., the lugs 24 of adjacent lids must never line up. To accomplish this, the lugs 24 of each adjacent lid in a stack are spaced a different circumferential distance $\alpha$ from a consistent diametrical X axis of each lid, as shown in FIG. 1. Additionally, the lugs 24 themselves, also extend over a varying circumferential distance from that of the adjacent lids. A particularly desirable arrangement involves three varying lid configurations. Exemplary values for the included angle $\beta$ and the spacing angles $\alpha_1$ and $\alpha_2$ are shown in the Table.

TABLE

| Lid No. | $\alpha_1$ | $\alpha_2$ | $\beta$ |
|---|---|---|---|
| 1 | 35° | 30° | 30° |
| 2 | 40° | 40° | 35° |
| 3 | 45° | 45° | 40° |

In the example above, every third lid of a stack would be identical and the lugs 24 of adjacent lids would remain out of phase. It should be noted that for lid number 1 of the example, the spacing angles $\alpha_1$ and $\alpha_2$ are of different degrees. This will ensure that the small included angle of this lid will remain out of phase with the adjacent lid at all times.

Figure 5:
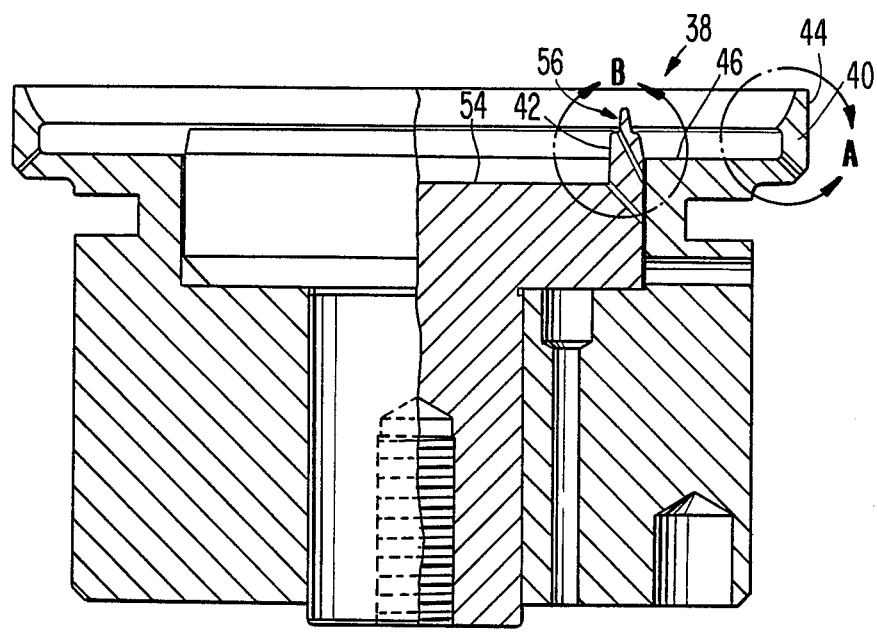
FIG. 5 A cross-section elevation view of a composite mold for forming the lid of FIG. 1.
Figure 7:
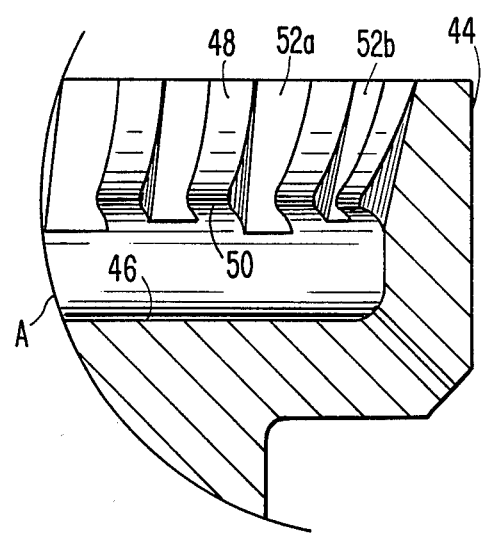
FIG. 7 An cutaway view of that portion of FIG. 5 within cut-out A.
Figure 9:
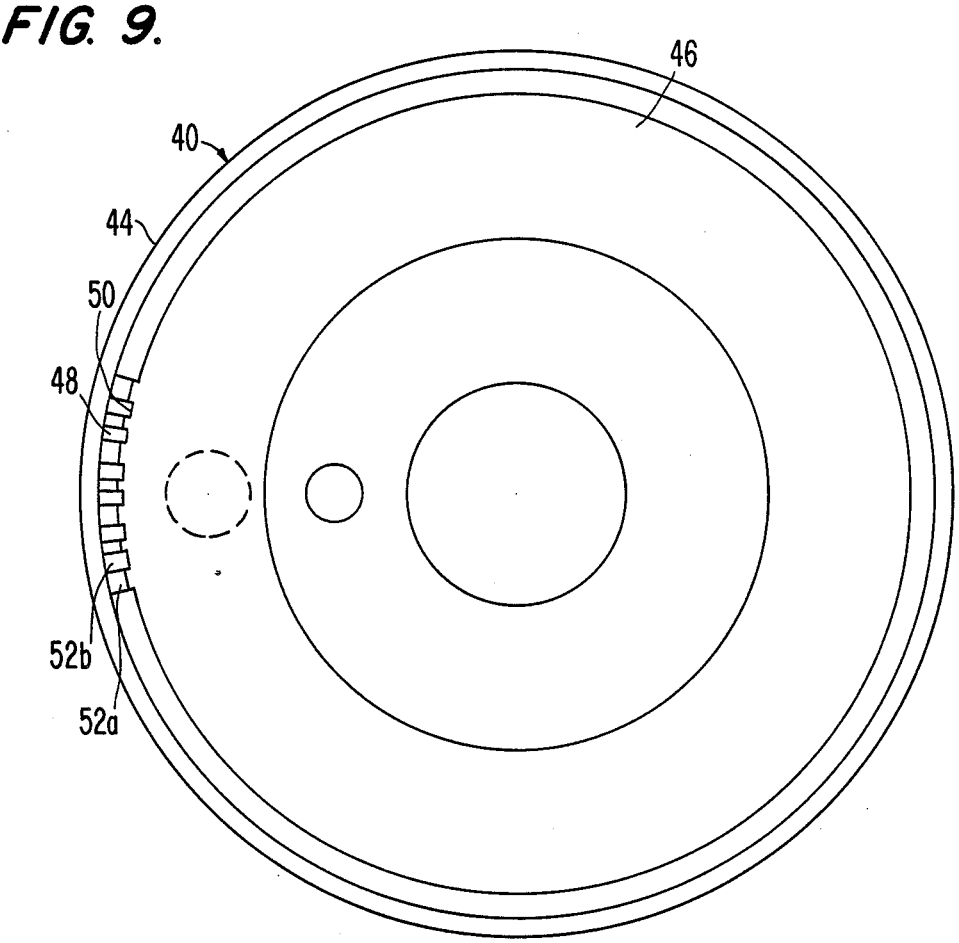
FIG. 9 A top view of the outer mold of FIG. 5.

FIG. 5 shows the mold 38 which is used to form the lids of the above mentioned configuration. The mold 38 consists of an outer portion 40 and an inner portion 42. The outer portion 40 includes an annular portion 44 which forms the peripheral skirt 14 of the lid 1, and a planar portion 46 which forms the annular section 4 of the lid 1. The annular portion 44 is better viewed in FIG. 7 which is a cutaway view of that portion of FIG. 5 within the cut-out A. As is shown in FIG. 7, the annular portion 44 includes a radially inward extending arcuate portion 48 which forms the lands 16 in the peripheral skirt 14 of the lid, and a ridge 50 which forms the waist 16. The annular portion 44 further includes a planar section 52 which forms the flutes 20 and 22. As shown in FIG. 9, there are two planar sections 52a and 52b. The portion 52a forms the large flutes 22 while the portion 52b forms the small flutes 20. While FIG. 9 only shows the portions 48 and 52 on a portion of the circumference of the mold 40, it should be appreciated that these portions extend over the entire circumference of the mold.

Figure 6:
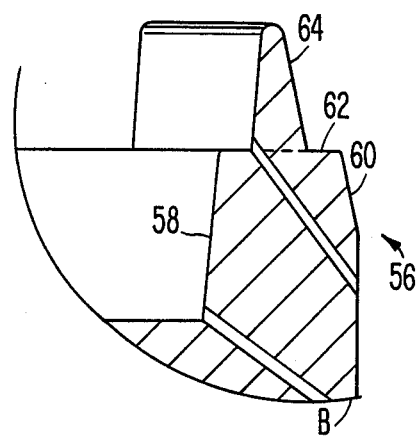
FIG. 6 An cutaway view of that portion of FIG. 5 within cut-out B.
Figure 8:
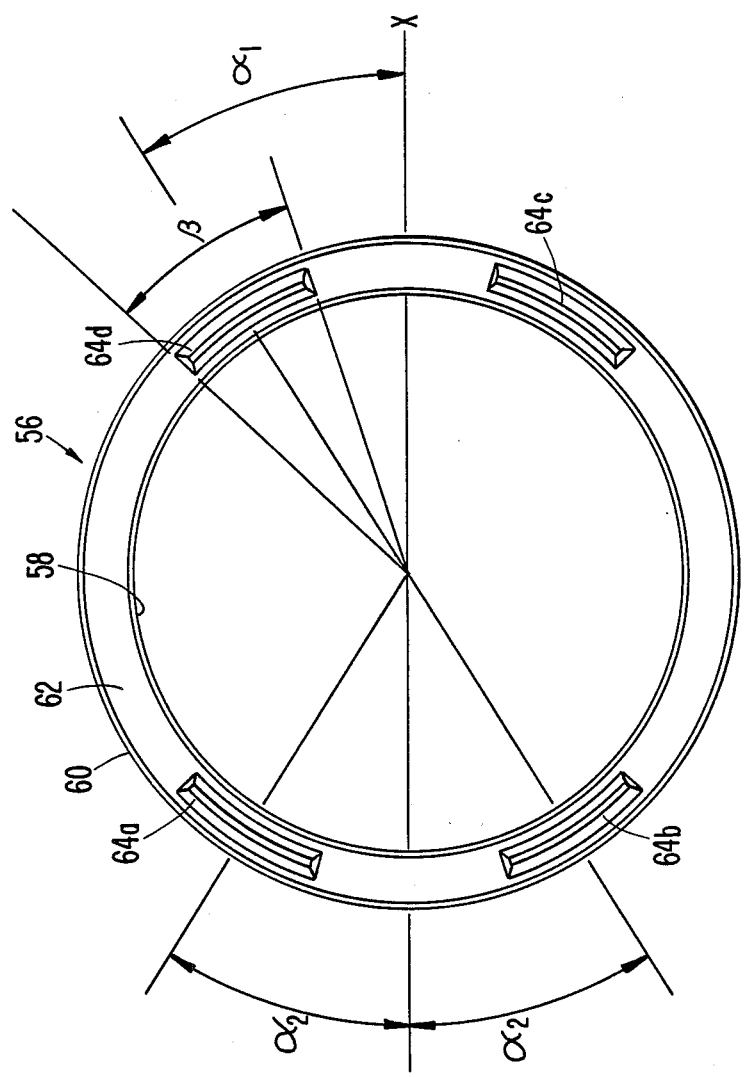
FIG. 8 A top view of the inner mold of FIG. 5.

As shown in FIG. 5, the inner mold 42 includes a planar portion 54 which forms the top hat section 2 of the lid 1, and an axial portion 56 which forms the recess 6 and the lugs 24. The axial portion 56 is better seen in the cutaway view of FIG. 6 which is that portion of FIG. 5 within cutout B. The axial portion 56 includes a circumferential planar portion 58 which forms the inner side wall 8 of recess 6 and a circumferential portion 60 which forms the outer side wall 10 of recess 6. An upper planar portion 62 is provided for forming the bottom wall 12 of recess 6. Extending from the upper planar portion 62 is extension 64. A plurality of extensions 64a, 64b, 64c, and 64d, are predeterminately spaced about the upper planar portion 62, as shown in FIG. 8, to form the U-shaped lugs 24. These extensions 64a, 64b, 64c and 64d, are spaced the predetermined circumferential distances $\alpha_1$ and $\alpha_2$ from the consistent diametrical X axis and extend the predetermined circumferential distance $\beta$ to form those lids set forth in the Table. In doing so, each lid is then reflectively symmetrical about the consistent diametrical X axis. It should be noted, that while the extensions 64 and lugs 24 as illustrated are arcuate in structure, these members can be linear and perform the identical function.

The foregoing is a description of a preferred embodiment of the invention, and it will be apparent to those skilled in the art that numerous modifications may be made to this invention without departing from its spirit. Therefore, it is Applicant's intention that the breadth of this invention be determined by the appended claims and their equivalents.

INDUSTRIAL APPLICABILITY

The disposable, thin-wall, plastic snap-on lid of the present invention will find its primary application in fast food establishments where the lids are placed on the countertop and unsupported by any external structure. The stack formed by these lids will maintain a neat vertical appearance, while allowing the top lid to be readily removed by the user. Lids of this type may also be used when supplying lids for a vending machine or other automatic filling equipment.

What is claimed:

1. A stack of disposable plastic circular lids for containers having openings surrounded by a beaded rim wherein the lids have aligned central axes and wherein each said lid comprises;
    a. a generally circular closure wall including an annular central portion lying in a first plane, an annular outer portion lying in a second plane below said first plane and an annular U-shaped recess extending between said central portion and said annular outer portion and having an inner wall, an outer wall and a bottom wall lying in a third plane below said second plane formed by said annular outer portion;
    b. a peripheral skirt depending from a rim portion of said closure wall for engaging the beaded rim of a container; and
    c. stabilizing means for distributing and counteracting both lateral and axial loads to maintain stack integrity while preventing jamming of adjacent lids, said stabilizing means including:
        (i) anti-jamming means for preventing sticking of adjacent lids including a plurality of lug members extending downwardly from said bottom wall for a sufficient distance to engage the bottom wall of the lower adjacent lid, the inner radial surface of each lug member being spaced radially outwardly along its entire axial length from the inner wall of said U-shaped recess; and
        (ii) anti-shifting means for preventing relative lateral movement of adjacent lids, said antishifting means including the portion of said inner wall which lies above the bottom wall of the upper adjacent lid.

2. A stack as defined in claim 1, wherein said lug members have a predetermined circumferential extent and have a midpoint which is circumferentially spaced a predetermined arcuate distance from the diametrical axis.

3. A stack as defined in claim 2, wherein each lid of said stack has an equal number of lug members and each of said lids are reflectively symmetrical about the diametrical axis.

4. A stack as defined in claim 3, wherein each lid includes four lug members.

5. A stack as defined in claim 2, wherein there are three different predetermined circumferential extents and said lug members of every third lid of said stack have the same predetermined circumferential extent.

6. A stack as defined in claim 2, wherein there are at least three different predetermined arcuate distances and said lug members of every third lid of said stack has the same predetermined arcuate distances.

7. A stack as defined in claim 5, wherein there are at least three different predetermined arcuate distances and said lug members of every third lid of said stack has the same predetermined arcuate distances.

8. A stack as defined in claim 7, wherein said lid having the largest predetermined circumferential extent has the largest predetermined arcuate distance and said lid having the smallest predetermined arcuate distance has the smallest predetermined circumferential extent.

9. A stack as defined in claim 8, wherein said largest predetermined circumferential extent is approximately 40° and said largest predetermined arcuate distance is approximately 45°, and said smallest predetermined circumferential extent is approximately 30° and said smallest predetermined arcuate distance is approximately 30°.

10. A stack as defined in claim 9, wherein a third lid is provided having a predetermined circumferential extent of approximately 35° and a predetermined arcuate distance of approximately 40°.

11. A stack as defined in claim 10 wherein said lug members taper in a downward direction away from said bottom wall.

12. A stack as defined in claim 11 wherein an upper portion of said lug members is open and said opening is smaller in the radial direction of said lid than the radial extent of said bottom wall and said opening is positioned on said bottom wall such that said bottom wall of said recess surrounds said upper opening of said lug members.

13. A stack as defined in claim 12, wherein the outer wall of said recess is shorter than said lug members and said lug members are radially spaced inward from a rim formed by said annular outer portion and said outer wall of said lower adjacent lid in said stack.

14. A stack as defined in claim 1, wherein said anti-jamming and anti-shifting means further includes a plurality of circumferentially spaced flutes provided about said peripheral skirt and a plurality of lands provided between each of said flutes, with said flutes varying in their circumferential length to thereby vary the spacing between said lands, with said lands of said lid forming a waist which rests on said rim portion of the lower adjacent lid.

15. A stack as defined in claim 14, wherein said flutes are of a first and second circumferential length, with said first and second lengths being alternatingly positioned between said lands.

16. A stack as defined in claim 15, wherein said flutes are positioned at varying radial distances from a central axis of said lid.

17. A stack as defined in claim 16, wherein said flutes of a greater circumferential length are positioned further from said central axis than said flutes of a lesser circumferential length.

18. A stack as defined in claim 14, wherein said lands include an inwardly facing arcuate camming surface which extends from a lower edge of said peripheral skirt to said waist, with said flutes allowing said waist to expand over said beaded rim of said container.

19. A stack as defined in claim 8, wherein said lid having the smallest predetermined circumferential extent has a first pair of lug members spaced a first predetermined arcuate distance from the diametrical axis and a second pair of lug members spaced a second predetermined arcuate distance from the diametrical axis and said lug members of each pair are reflectively symmetrical about the diametrical axis.

20. A stack as defined in claim 19, wherein said first predetermined arcuate distance is approximately 35° and said second predetermined arcuate distance is approximately 30°.

21. A mold for forming a disposable plastic container lid for a container having an opening surrounded by a beaded rim wherein the lid is stackable with other lids, said mold comprising;
an inner mold element and a coaxial outer mold element,
said inner mold element including a central planar portion and an upstanding peripheral portion having an essentially flat top surface and a plurality of extensions circumferentially spaced about said top surface, said extensions being radially spaced from inner and outer circumferential edges of said top surface,
said outer mold element including a central opening for accommodating said inner mold element, an annular planar portion, and an upstanding peripheral portion having an inner circumferential surface including a plurality of radially inwardly extending arcuate portions forming a ridge and a plurality of recesses provided between said inwardly extending arcuate portions,
wherein said recesses vary in their circumferential length between each extending arcuate portion.

22. A mold for forming the lid of claim 1 comprising:
an inner mold element and a coaxial outer mold element,
said inner mold element including a central planar portion lying in a first plane and an upstanding U-shaped peripheral portion having an essentially flat top surface and a plurality of extensions circumferentially spaced about said top surface, said extensions being radially spaced along their entire axial length from inner and outer circumferential edges of said top surface,
said outer mold element including a central opening for accommodating said inner mold element, an annular planar portion lying in a second plane above said first plane, and an upstanding peripheral portion having an inner circumferential surface including a plurality of radially inwardly extending arcuate portions forming a ridge and a plurality of recesses provided between said inwardly extending arcuate portions,
wherein said recesses vary in their circumferential length between each extending arcuate portion and wherein said extensions have a height greater than the distance between said second plane and said essentially flat top surface and less than the distance between said first plane and said essentially flat top surface.

23. A mold as defined in claim 22, wherein said recesses are of two sizes and said sizes are alternated between each extending arcuate portion.

24. A mold as defined in claim 23, wherein said recesses having a greater circumferential length are spaced a greater radial distance from said central axis.

25. A mold as defined in claim 22, wherein said recesses vary in their radial distance from a central axis of said mold.

26. A disposable plastic circular lid for a container having an opening surrounded by a beaded rim wherein the lid can be stacked with other lids having aligned central axes and wherein said lid comprises:
  a. a generally circular closure wall including an annular central portion lying in a first plane, an annular outer portion lying in a second plane below said first plane and an annular U-shaped recess extending between said central portion and said annular outer portion and having an inner wall, an outer wall, and a bottom wall lying in a third plane below said second plane formed by said annular outer portion;
  b. a peripheral skirt depending from a rim portion of said closure wall for engaging the beaded rim of a container; and
  c. stabilizing means for disturbing and counteracting both lateral and axial loads during stacking to maintain stack integrity while preventing jamming of adjacent lids, said stabilizing means including:
    (i) anti-jamming means for preventing sticking of adjacent lids during stacking including a plurality of lug members extending downwardly from said bottom wall for a sufficient distance to engage the bottom wall of a lower adjacent lid, the inner radial surface of each lug member being spaced radially outwardly along its entire axial length from the inner wall of said U-shaped recess; and
    (ii) anti-shifting means for preventing relative lateral movement of adjacent lids during stacking, said anti-shifting means including the portion of said inner wall which lies above the bottom wall of an upper adjacent lid.

27. A lid as defined in claim 26, wherein said lug members have a predetermined circumferential extent and have a midpoint which is circumferentially spaced a predetermined arcuate distance from the diametrical axis.

28. A lid as defined in claim 27, wherein said lid includes four lug members.

29. A lid as defined in claim 28, wherein said predetermined circumferential extent is in the range of 30 degrees-40 degrees and said predetermined arcuate distance is in the range of 30 degrees-45 degrees.

30. A lid as defined in claim 26, wherein said lug members taper in a downward direction away from said bottom wall.

31. A lid as defined in claim 30, wherein an upper portion of said lug members is open and said opening is smaller in the radial direction of said lid than the radial extent of said bottom wall and said opening is positioned on said bottom wall such that said bottom wall of said recess surrounds said upper opening of said lug members.

32. A lid as defined in claim 31, wherein the outer wall of said recess is shorter than said lug members and said lug members are radially spaced inward from a rim formed by said annular outer portion and said outer wall of said lower adjacent lid in said stack.

33. A lid as defined in claim 26, wherein said anti-jamming and anti-shifting means further includes a plurality of circumferentially spaced flutes provided about said peripheral skirt and a plurality of lands provided between each of said flutes, with said flutes varying in their circumferential length to thereby vary the spacing between said lands, with said lands of said lid forming a waist which rests on said rim portion of the lower adjacent lid.

34. A lid as defined in claim 33, wherein said flutes are of a first and second circumferential length, with said first and second lengths being alternatingly positioned between said lands.

35. A lid as defined in claim 34, wherein said flutes are positioned at varying radial distances from a central axis of said lid.

36. A lid as defined in claim 35, wherein said flutes of a greater circumferential length are positioned further from said central axis than said flutes of a lesser circumferential length.

37. A lid as defined in claim 33, wherein said lands include an inwardly facing arcuate camming surface which extends from a lower edge of said peripheral skirt to said waist, with said flutes allowing said waist to expand over said beaded rim of said container.

* * * * *

UNITED STATES PATENT AND TRADEMARK OFFICE
CERTIFICATE OF CORRECTION

PATENT NO. : 4,877,151

DATED : October 31, 1989

INVENTOR(S) : Rush et al

It is certified that error appears in the above-identified patent and that said Letters Patent is hereby corrected as shown below:

ON TITLE PAGE:
Insert after "Inventors:" the following:

-- [73] Assignee: James River Corporation of Virginia, Richmond, VA. --

Signed and Sealed this

Twenty-first Day of July, 1992

Attest:

DOUGLAS B. COMER

*Attesting Officer*  *Acting Commissioner of Patents and Trademarks*